(12) United States Patent
Sato (10) Patent No.: US 9,151,927 B2
(45) Date of Patent: Oct. 6, 2015

(54) RACK AND OPTICAL APPARATUS USING THE SAME

(71) Applicant: CANON KABUSHIKI KAISHA, Tokyo (JP)

(72) Inventor: Takehiko Sato, Utsunomiya (JP)

(73) Assignee: CANON KABUSHIKI KAISHA (JP)

(*) Notice: Subject to any disclaimer, the term of this patent is extended or adjusted under 35 U.S.C. 154(b) by 20 days.

(21) Appl. No.: 14/225,678

(22) Filed: Mar. 26, 2014

(65) Prior Publication Data

US 2014/0293462 A1 Oct. 2, 2014

(30) Foreign Application Priority Data

Mar. 29, 2013 (JP) ................. 2013-070862

(51) Int. Cl.

| | | |
|---|---|---|
| *G02B 7/02* | (2006.01) | |
| *G02B 15/14* | (2006.01) | |
| *G02B 7/04* | (2006.01) | |
| *G02B 7/10* | (2006.01) | |
| *G02B 7/08* | (2006.01) | |

(52) U.S. Cl.
CPC ................. *G02B 7/023* (2013.01); *G02B 7/022* (2013.01); *G02B 7/04* (2013.01); *G02B 7/08* (2013.01); *G02B 7/102* (2013.01); *G02B 15/14* (2013.01); *Y10T 74/173* (2015.01); *Y10T 74/18* (2015.01); *Y10T 74/19949* (2015.01)

(58) Field of Classification Search
CPC ........ G02B 7/022; G02B 7/023; G02B 7/026; G02B 7/04; G02B 7/08; G02B 7/10; G02B 7/102; G02B 15/14; G02B 15/177; F16H 25/20; F16H 25/2009; F16H 25/2021; F16H 25/2025; F16H 25/2409; F16D 43/20; Y10T 74/17; Y10T 74/177; Y10T 74/18; Y10T 74/173; Y10T 74/18576; Y10T 74/19949
USPC ................. 359/813, 819, 822–824, 694–704; 396/75, 83, 85, 349; 74/89.14, 89.23, 74/89.42, 424.71, 441
See application file for complete search history.

(56) References Cited

U.S. PATENT DOCUMENTS

| | | | | |
|---|---|---|---|---|
| 7,446,960 | B2 * | 11/2008 | Morinaga ..................... | 359/819 |
| 7,474,845 | B2 * | 1/2009 | Hayashi et al. ................. | 396/85 |
| 7,551,369 | B2 * | 6/2009 | Tomita et al. .................. | 359/704 |

(Continued)

FOREIGN PATENT DOCUMENTS

| | | |
|---|---|---|
| JP | 11-295578 A | 10/1999 |
| JP | 2005-315935 A | 11/2005 |

(Continued)

*Primary Examiner* — Loha Ben
(74) *Attorney, Agent, or Firm* — Rossi, Kimms & McDowell LLP (57) ABSTRACT

The rack includes a first member having a first tooth engaged with a lead screw, a second member having a second tooth engaged with the lead screw, a third member having a third tooth engageable with the lead screw, a first forcing unit configured to apply a force between the first and second members, a second forcing unit configured to apply a force between the first member and third members, and a limiter configured to limit a distance between the third tooth and the lead screw so that the third tooth is separated from the lead screw when the first and second teeth are engaged with the lead screw by the force applied by the first forcing unit and a distance between the first tooth and the third tooth is smaller than an outer diameter of the lead screw.

10 Claims, 5 Drawing Sheets

(56) References Cited

U.S. PATENT DOCUMENTS 7,706,083 B2 * 4/2010 Saito ............................ 359/694
7,916,414 B2 * 3/2011 Nakamura et al. ............ 359/824

FOREIGN PATENT DOCUMENTS

| | | |
|---|---|---|
| JP | 2009-042306 A | 2/2009 |
| JP | 2011-027938 A | 2/2011 |

* cited by examiner

RACK AND OPTICAL APPARATUS USING THE SAME

BACKGROUND OF THE INVENTION

1. Field of the Invention

The present invention relates to a rack, and an optical apparatus using the rack.

2. Description of the Related Art

Along with a demand for a smaller size of an optical apparatus, such as a digital still camera and a digital video camera, a lens barrel attachable to it is also required for a smaller size. For a smaller battery and a longer capture time, the power saving of the lens barrel is also required. Japanese Patent Laid-Open No. ("JP") 2005-315935 discloses a moving mechanism that uses a motor and rack to move a lens holder frame in an optical axis direction and a helical torsion spring to force a rack against a lead screw of the motor.

In the rack configured to sandwich the lead screw using a main tooth and a holding tooth, the main tooth and holding tooth may jump from a thread of the lead screw due to the impact, such as a drop, and thereby the captured image is likely to disturb and blur. When a strong force is applied between the rack and the lead screw as proposed in JP 2005-315935 so as to prevent the tooth jump, the motor rotational load increases due to the increased frictional force between them, and the power saving of the motor would be lost or the motor and lens barrel would become larger. On the other hand, in the rack in which only the forced main tooth is engaged with the lead screw in the normal state, the opposite tooth arranged opposite to the main tooth with respect to the lead screw is engaged with the thread of the lead screw on impact, and the positional offset of the rack in the axial direction of the screw is prevented. However, when only the main tooth contacts the lead screw, it is necessary for stable movements of the rack to increase the force applied to the main tooth, and the motor rotational force increases and the motor power saving would be lost or the motor and the lens barrel would become larger.

SUMMARY OF THE INVENTION

The present invention provides a compact rack and an optical apparatus using the same, which can prevent a tooth jump against a predetermined impact.

A rack according to the present invention is attached to a movable member and configured to transmit a driving force of a driver to the movable member. The rack includes a first member having a first tooth engaged with a lead screw rotated by the driver, a second member having a second tooth arranged opposite to the first tooth with respect to the lead screw and engaged with the lead screw, a third member having a third tooth arranged opposite to the first tooth with respect to the lead screw and engageable with the lead screw, a first forcing unit configured to apply a force between the first member and the second member so that the first tooth and the second tooth approach to each other, a second forcing unit configured to apply a force between the first member and the third member so that the first tooth and the third tooth approach to each other, and a limiter configured to limit a distance between the third tooth and the lead screw so that the third tooth is separated from the lead screw when the first tooth and the second tooth are engaged with the lead screw by the force applied by the first forcing unit and a distance between the first tooth and the third tooth is smaller than an outer diameter of the lead screw on a plane that passes the center axis of the lead screw and a contact position between the first tooth and the lead screw.

Further features of the present invention will become apparent from the following description of exemplary embodiments with reference to the attached drawings.

DESCRIPTION OF THE EMBODIMENTS

Figure 1A:
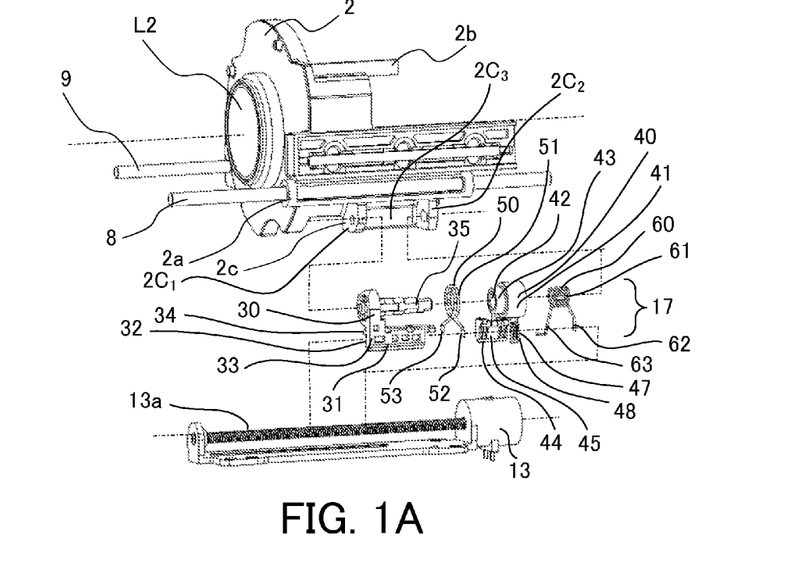
FIGS. 1A and 1B are partially exploded perspective and sectional views of a lens barrel according to this embodiment, respectively.
Figure 1B:
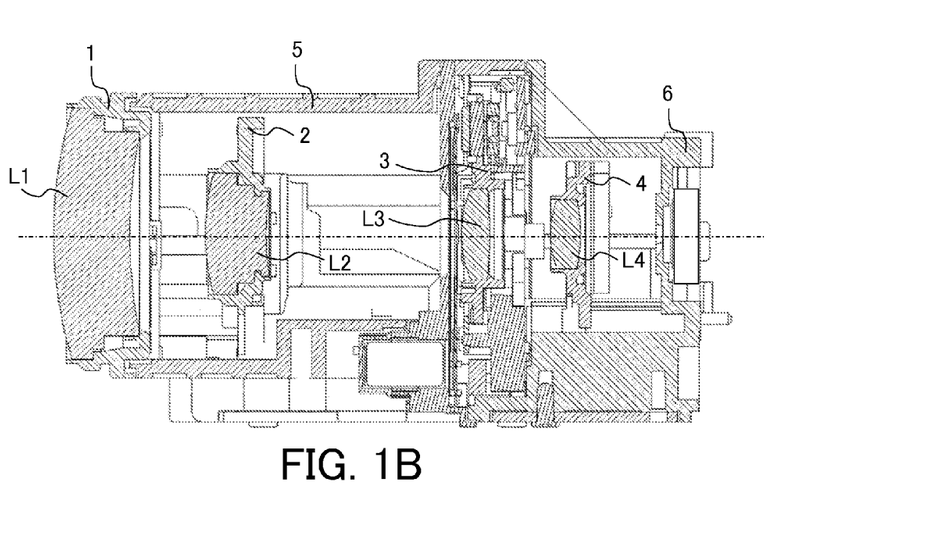

FIG. 1B is a sectional view of a lens barrel according to this embodiment. In use, the lens barrel is attached to or integrated with an image-pickup apparatus (optical apparatus), such as a digital video camera and a digital still camera. The lens barrel includes an image-pickup optical system configured to form an optical image of an object, and an alternate long and short dash line represents an optical axis of the image-pickup optical system.

The image-pickup optical system of this embodiment includes a four-unit (convex, concave, convex, and convex) magnification-varying optical system that includes a fixed first lens L1, a second lens unit (magnification-varying or zoom lens) L2, a third lens unit (image stabilization lens) L3, a fourth lens unit (focus lens) L4, and a diaphragm.

The second lens unit L2 moves in the optical axis direction and varies a magnification (or changes a focal length). The third lens unit L3 moves in a direction orthogonal to the optical axis and stabilizes an image. The "orthogonal direction" may have a component orthogonal to the optical axis, and may be moved oblique to the optical axis. The fourth lens unit L4 moves in the optical axis direction for focusing. The diaphragm adjusts a light quantity incident upon the image sensor.

Reference numeral 1 denotes a fixed barrel configured to hold the first lens unit L1. Reference numeral 2 denotes a second-unit moving frame configured to hold the second lens unit L2. Reference numeral 3 denotes a shift unit configured to move the third lens unit L3 in a direction orthogonal to the optical axis, and is fixed onto a fixed cylinder 5 by screws after it is positioned. Reference numeral 4 denotes a fourth-unit moving frame configured to hold the fourth lens unit L4. Reference numeral 6 is a holder onto which the image sensor, such as a CCD or a CMOS sensor, is fixed. The image sensor photoelectrically converts an optical image formed by the image-pickup optical system. The fixed barrel 1 and the holder 6 are fixed by screws onto the fixed cylinder 5.

FIG. 1A is an exploded perspective view of the rack 17 and its peripherals according to this embodiment. The details of the rack 17 will be described later.

Reference numerals 8 and 9 denote guide bars, positioned and fixed onto the fixed cylinder 5 and the holder 6. The guide bars 8 and 9 support the second-unit moving frame 2 movably in the optical axis direction, and extend parallel to the optical axis.

The second-unit moving frame 2 has a sleeve 2a as a connector with the guide bar 8, and a sleeve (not illustrated) as a connector with the guide bar 9. The sleeve 2a has a perforation hole through which the guide bar 8 perforates. As a result, the guide bars 8 and 9 are supported slidably in the optical axis direction.

The second-unit moving frame 2 has a light shield 2b, and a photo-interrupter (not illustrated) is provided so as to optically detect a movement of the light shield 2b in the optical axis direction. The light shield 2b and the photo-interrupter (not illustrated) constitute a zoom reset switch configured to detect whether the second lens unit L2 is located at a reference position.

The second-unit moving frame 2 has a rack holder 2c configured to rotatably hold the rack 17. The rack holder 2c includes two blocks $2c_1$ and $2c_2$ each having a shaft hole part, and a recess $2c_3$ between these blocks $2c_1$ and $2c_2$. The rack 17 is housed in the recess $2c_3$ while part of the rack 17 projects from it. Both ends of a shaft 35 of a main rack 30, which will be described later, are rotatably supported by the shaft hole parts of the blocks $2c_1$ and $2c_2$. The part of the rack 17 which projects from the recess $2c_3$ is engaged with the lead screw 13a of the zoom motor 13 as a driver.

The zoom motor 13 is the driver configured to drive the second lens unit L2 in the optical axis direction to vary the magnification. The zoom motor 13 is fixed onto the fixed cylinder 5 by two screws, and includes the lead screw 13a concentric to a rotor (not illustrated) that is configured to rotate. The lead screw 13a extends in a direction parallel to the optical axis. The lead screw 13a is engaged with the rack 17 attached to the second-unit moving frame 2. As the rotor rotates, the second lens unit L2 is driven in the optical axis direction. The lead screw 13a is made, for example, of SUS and iron.

The rack 17 of this embodiment forms part of a moving unit configured to move the second-unit lens L2, but may serve as a moving unit configured to move the fourth-unit lens L4. In this case, a focus motor (not illustrated) is provided so as to drive the fourth-unit lens L4 in the optical axis direction for focusing, and the focus motor has a lead screw concentric to a rotor that is configured to rotate. The lead screw is engaged with a rack attached to the fourth-unit moving frame 4. As the rotor rotates, the fourth-unit lens L4 is driven in the optical axis direction. A helical torsion spring puts the idle spaces or backlashes of the fourth-unit moving frame 4, the guide bars, the rack, and the lead screw to one side, and prevents unsteady engagement or gearing. The focus motor is fixed onto the holder 6 by two screws. A photo-interrupter is provided to detect a light shield provided to the focus-unit moving frame 4, and used as a focus reset switch configured to detect that the forth lens unit L4 is located at a reference position.

Figure 2:
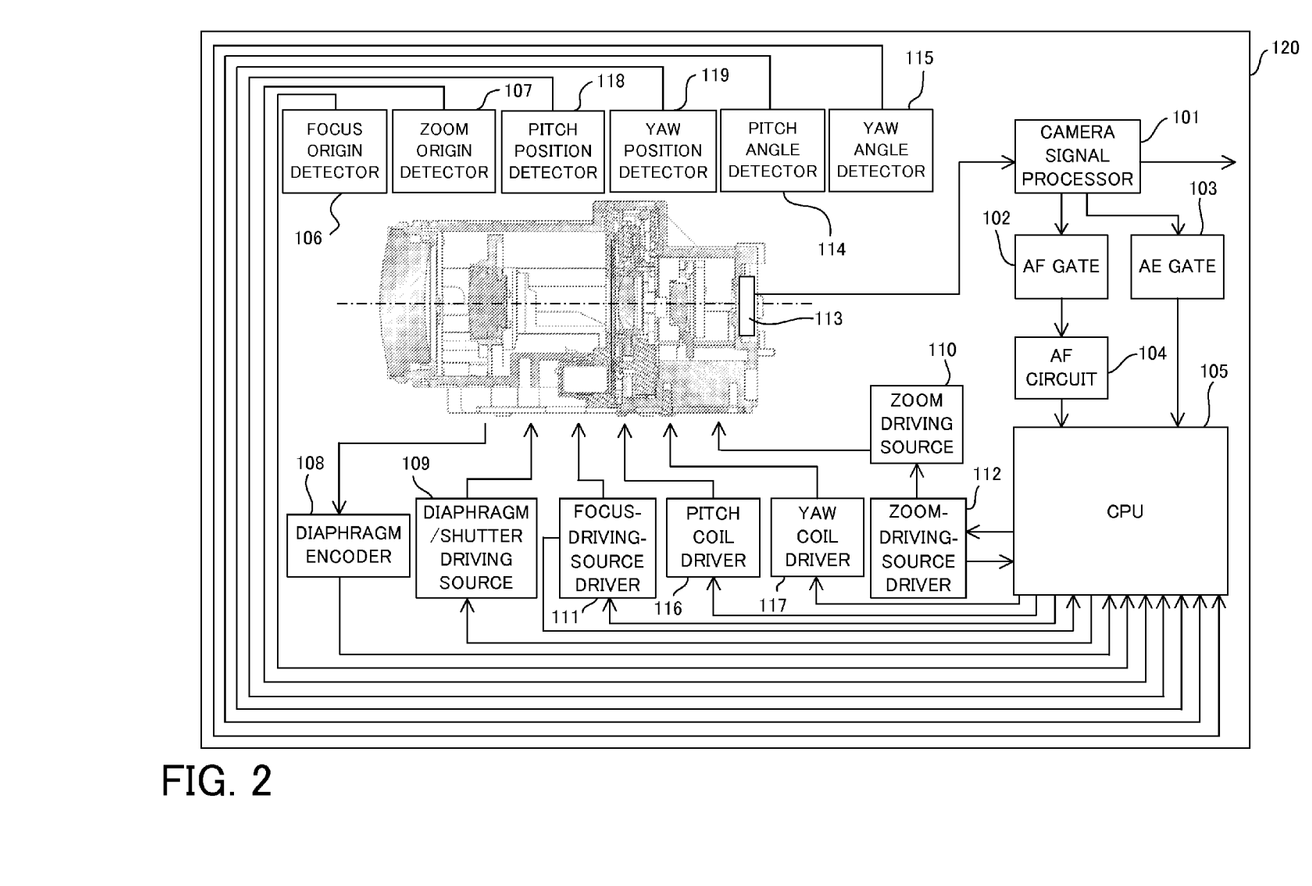
FIG. 2 is a block diagram of electric circuits in an optical apparatus to which the lens barrel illustrated in FIGS. 1A and 1B is detachably attached.

FIG. 2 is a block diagram of an electric circuit of the optical apparatus (image-pickup apparatus body) to which the lens barrel of this embodiment is detachably attached. In the optical apparatus 120, the optical image of the object formed by the image-pickup optical system on the image-pickup plane of the image sensor 113 experiences various processing, such as a predetermined amplification and a γ correction, by the camera signal processor 101.

A contrast signal in a predetermined area taken out of the image signal that has experienced the predetermined processing passes an autofocus ("AF") gate 102 or an auto-exposure ("AE") gate 103. In particular, an AF circuit 104 generates one or more outputs relating to a high frequency component based on the contrast signal that has passed the AE gate 102. A CPU 105 determines, based on a signal level of the AE gate 103, whether the exposure is proper, and sets a proper F-value or shutter speed via a diaphragm/shutter driving source 109 when the exposure is improper. In the AF operation, the CPU 105 controls driving of a focus-driving-source driver 111 as a focus driving source so that the output generated by the AF circuit 104 has a peak. In addition, the CPU 105 controls an aperture diameter through controlling driving of the diaphragm/shutter driving source 109 for proper exposure so that the output of the diaphragm encoder 108 has a predetermined value that is calculated from an average value of the signal output that has passed the AE gate 103.

Reference numeral 110 denotes a stepping motor (zoom motor 13) as the zoom driving source. Reference numeral 112 denotes a zoom-driving-source driver configured to drive the stepping motor 110 in accordance with a control signal sent from the CPU 105 that also serves as a zoom controller.

The focus origin sensor 106 using an encoder, such as a photo-interrupter, detects an absolute reference position used to detect the absolute position of the fourth lens unit L4 in the optical axis direction. The zoom origin sensor 107 using the encoder, such as a photo-interrupter, detects the absolute reference position used to detect the absolute position of the second lens unit L2 in the optical axis direction.

A shift angle in the image-pickup apparatus is detected, for example, by integrating an output of an angular speed sensor, such as a vibration gyro fixed in the image-pickup apparatus. The CPU 105 processes each of an output of the shift angle detector 114 in a pitch direction and an output of the shift angle detector 115 in a yaw direction. The electrification to the coil (not illustrated) is controlled in accordance with the output from the pitch shift angle detector 114 by controlling driving of a pitch coil driver 116. In accordance with the output from the yaw shift angle detector 115, driving of the yaw coil driver 117 is controlled and the electrification to the coil (not illustrated) is controlled.

Due to the above control, the shift unit 3 moves on a plane orthogonal to the optical axis. The CPU 105 processes the outputs of a position detector 118 in the pitch direction and a position detector 119 in the yaw direction. As the third lens unit L3 moves, the passing light flux in the lens barrel is deflected. The third lens unit L3 is moved so as to deflect the passing light flux by a cancelling amount in a direction for cancelling a displacement of the object image on the image sensor 113 when the image-pickup apparatus vibrates. Thereby, even when the image-pickup apparatus vibrates, the object image is stabilized on the image sensor 113 (so-called image stabilization).

The CPU 105 obtains a signal corresponding to a difference between a shift signal of the image-pickup apparatus obtained by the pitch shift angular detector 114 and the yaw shift angle detector 115, and a shift amount signal obtained from the pitch position detector 118 and the yaw position detector 119. The CPU 105 moves the shift unit 3 based on this signal using the pitch coil driver 116 and the yaw coil driver 117. Due to this control, the position of the correction lens unit L3 is controlled so as to reduce the difference signal and the correction lens unit L3 is maintained at the target position.

Figure 3A:
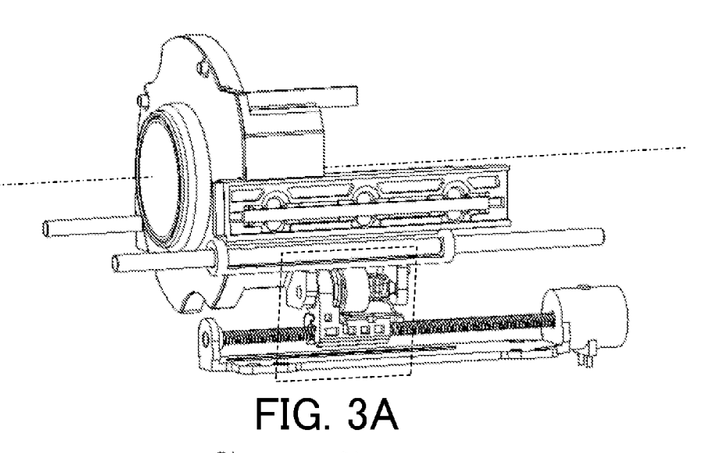
FIGS. 3A, 3B, and 3C are partially perspective views of the lens barrel illustrated in FIGS. 1A and 1B.
Figure 3B:
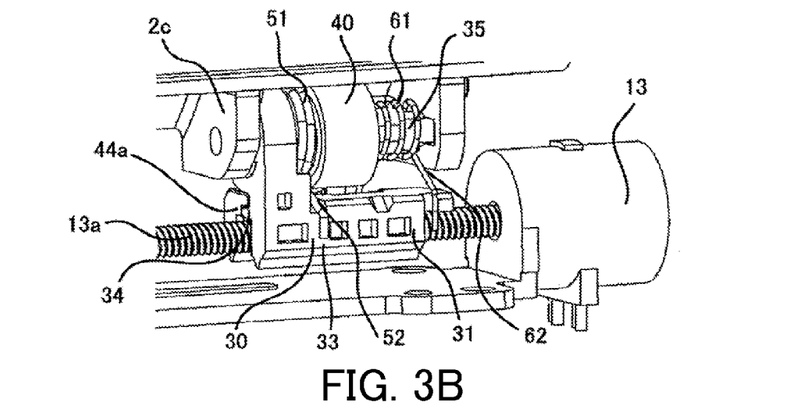
Figure 3C:
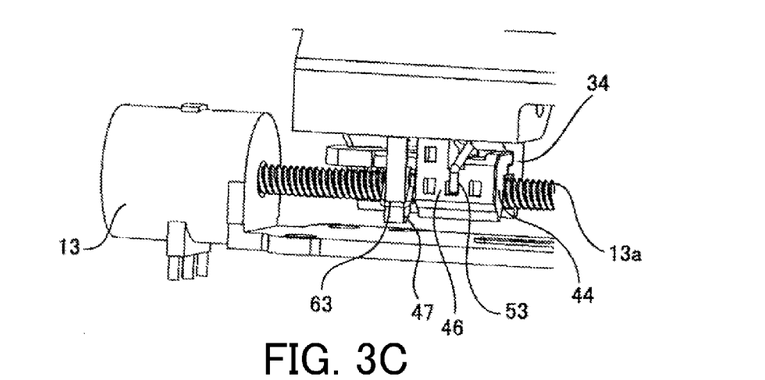

Referring now to FIGS. 1A, 1B, 3a, 3B, and 3C, the details of the rack 17 will be described. FIGS. 3B and 3C are enlarged perspective views at different angles near the portion in FIG. 3A designated by a dotted line.

The rack 17 is attached to a second-unit moving frame 2 a movable member, and transmits a driving force of the zoom motor 13 as the driver, to the second-unit moving frame 2. The rack 17 includes a main rack 30, a sub-rack 40, a compression spring (clamp spring) 50, and a helical torsion spring 60, and the rack 17 is miniaturized. The rack 17 is made, for example, of POM and PC.

The main rack 30 has an engagement unit (first member) 31 and a shaft 35.

The engagement unit 31 has an L shape, is coupled with the shaft 35 at one end of the L shape, projects from the shaft 35, and is formed as a bent arm approximately parallel to the shaft 35. Main teeth (first teeth) 32 are formed on the lead screw side of the engagement unit 31. The main teeth 32 are engaged with the thread of the lead screw 13a, and receive a driving force of the zoom motor 13 from the lead screw 13a. A surface 33 is located opposite to the lead screw 13a of the engagement unit 31, and serves as an engagement surface configured to engage with an arm 52 of the compression spring 50 and an arm 62 of the helical torsion spring 60, as illustrated in FIGS. 3B and 3C. A stopper (limiter) 34 is formed and projects as a projection towards the lead screw near the center of an L-shaped perpendicular part of the engagement unit 31.

The shaft 35 penetrates a coil part 51 of the compression spring 50, a shaft hole part 42 of a body of the sub-rack 40, and a coil part 61 of the helical torsion spring 60 in this order, and is rotatably supported by the shaft hole parts of the two blocks $2c_1$ and $2c_2$ of the rack holder 2c in the two-unit moving hole 2. The shaft 35 serves as the rotating axis of the rack 17.

The sub-rack 40 includes the body 41, and engagement units 44 and 47.

The body 41 has a shape made by concentrically combining two differently sized cylinders, and has a cylindrical shaft hole part 42 having the center axis aligned with the concentric axis. The shaft 35 of the main rack 30 is inserted into the shaft hole part 42. A cylindrical surface 43 having a small cylinder forms a step to a cylindrical surface of the larger cylinder, and this step serves as a housing unit configured to house the coil part 51 that is part of the compression spring 50.

The engagement unit (third member) 44 projects out of the body 41, and extends parallel to the center axis of the body 41. Opposite teeth (third teeth) 45 are formed on the lead screw side of the engagement unit 44. The opposite teeth 45 are engaged with the lead screw 13a. A surface 46 of the engagement unit 44 opposite to the lead screw 13a serves as an engagement surface engaged with the arm 53 of the compression spring 50.

As illustrated in FIG. 3B, a stopper (limiter) 44a is formed as a projection that projects towards the lead screw on the side closer to the body 41 of the engagement unit 44, contacts the stopper 34 of the main rack 30, and prevents a further rotation of the engagement unit 44 towards the lead screw. As a result, even when a force is applied between the engagement units 31 and 44 by the compression spring 50, the opposite teeth 45 do not contact the lead screw 13a in the normal state.

Thus, the stoppers 34 and 44a separate the opposite teeth 45 from the lead screw 13a in the normal state. As described later with reference to FIG. 5B, the stoppers 34 and 44a limit a distance between the opposite tooth 45 and the lead screw 13a so that a distance d between the main tooth 32 and the opposite tooth 45 is smaller than an outer diameter D. Instead of providing the stoppers to both the engagement units 31 and 44, only one of them may be provided with the stopper. The main tooth 32, the opposite tooth 45, and the holding tooth 48 have shapes corresponding to the thread of the lead screw 13a.

The engagement unit (second member) 47 projects out of the body 41. Holding teeth 48 (second teeth) are formed on the lead screw side of the engagement unit 47, and a surface of the engagement unit 47 opposite to the lead screw 13a serves as an engagement surface engaged with the arm 63 of the helical torsion spring 60. The opposite teeth 45 and the holding teeth 48 oppose to the main teeth 32 of the main rack 30 with respect to the lead screw 13a.

The compression spring 50 is a second forcing unit configured to apply a force between the engagement units 31 and 44 so that the main teeth 32 and opposite teeth 45 approach to each other using the shaft 35 as a rotational center. The compression spring 50 is provided around the cylindrical surface 43 of the body 41 of the sub-rack 40, and includes the coil part 51 and the arms 52 and 53. The shaft 35 of the main rack 30 penetrates the coil part 51. The arm 52 is engaged with the surface 33 of the main rack 30 as illustrated in FIG. 3B, and the arm 53 is engaged with the surface 46 of the sub-rack 40, as illustrated in FIG. 3C.

The helical torsion spring 60 is a first forcing unit configured to apply a force between the engagement units 31 and 47 so that the main teeth 32 and the holding teeth 48 can approach to each other. The helical torsion spring 60 is an elastic member configured to applies an axial elastic force to the second-unit moving frame 2, the guide bar 8, the rack 17, and the lead screw 13a in a direction parallel to the optical axis using. Thereby, the idle spaces or backlashes of these components are put aside.

The helical torsion spring 60 has a coil portion 61 and arms 62 and 63. The shaft 35 of the main rack 30 perforates the coil portion 61. The arm 62 is engaged with the surface 33 of the main rack 30, as illustrated in FIG. 3B. The arm 63 has a U-shaped tip as illustrated in FIG. 1A, and is engaged with side surfaces and a surface of the sub-rack 40 opposite to the lead screw of the engagement unit 47, as illustrated in FIG. 3C.

The main teeth 32 and the holding teeth 48 hold the lead screw 13a by the force applied by the helical torsion spring 60. In this normal state, the opposite teeth 45 do not contact the lead screw 13a. Therefore, the driving force generated by the rotation of the lead screw 13a is transmitted to the second-unit moving frame 2 via the main teeth 32 and the holding teeth 48, and moves the second-unit moving frame 2 in the optical axis direction. The force of the helical torsion spring 60 is smaller than the force of the compression spring 50.

Figures 4A, 4B:
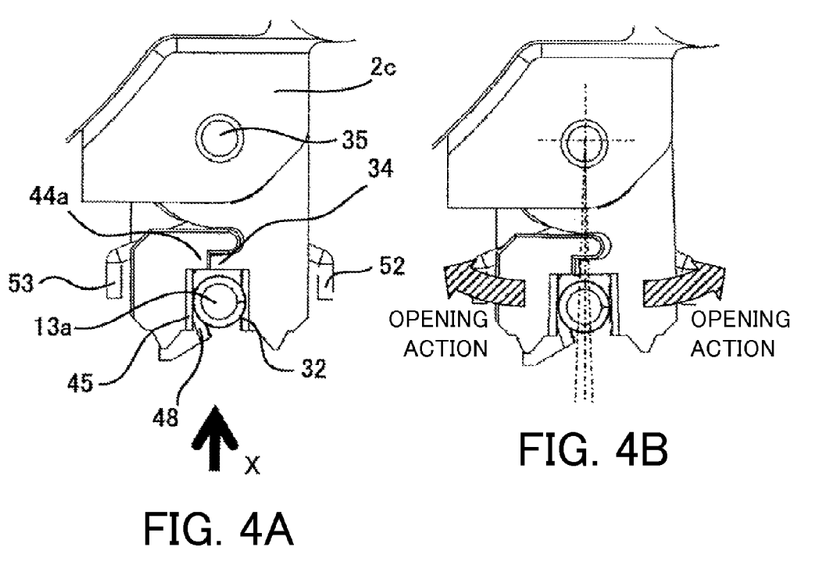
FIGS. 4A and 4B are enlarged plane views at an engagement between a lead screw and a rack illustrated in FIGS. 1A and 1B.
Figure 5A:
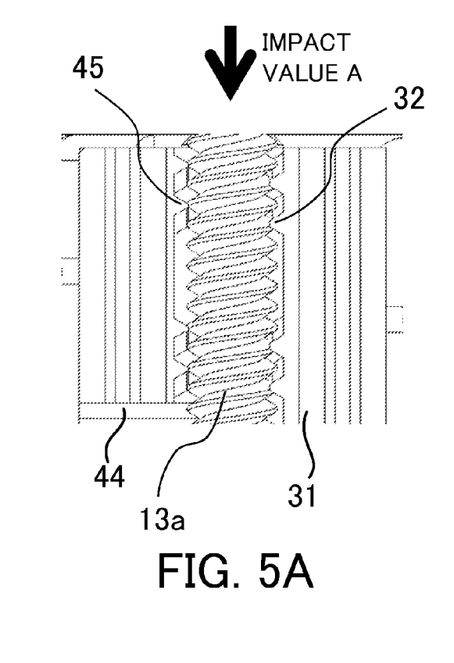
FIGS. 5A, 5B, and 5C are enlarged sectional views at the engagement between the lead screw and rack illustrated in FIGS. 1A and 1B.
Figure 5B:
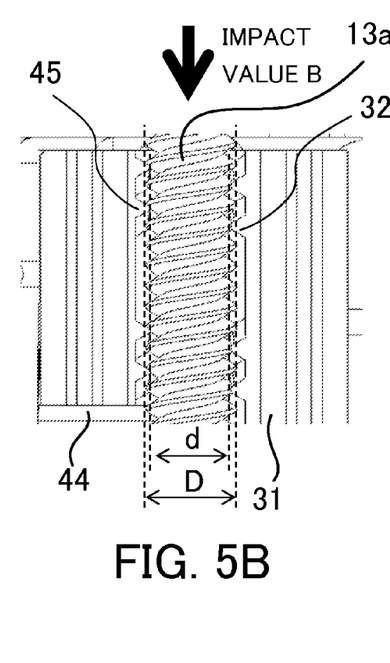
Figure 5C:
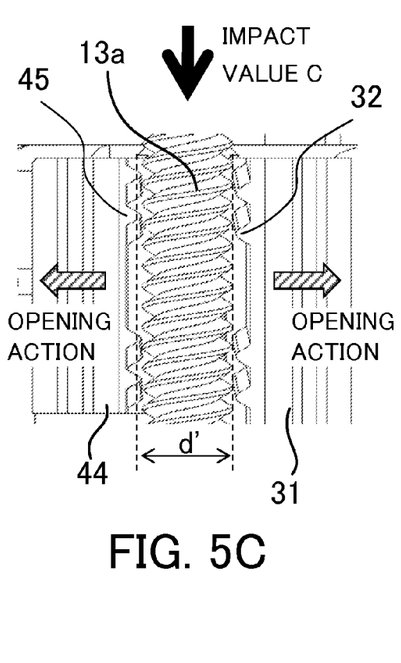

FIGS. 4A and 4B are enlarged plane views of the lead screw 13a and the engagement units of the rack 17. FIG. 4A illustrates that the opening action described later has not yet occurred, and FIG. 4B illustrates that the opening action has occurred. FIGS. 5A, 5B, and 5C are enlarged sectional view of the engagements between the lead screw 13a and each of the main teeth 32, the opposite teeth 45, and the holding teeth 48 viewed from an arrow X in FIG. 4A. Now assume a plane that passes the center axis of the lead screw 13a and a contact position between the main tooth 32 and the lead screw 13a in the normal state. The "normal state" is a state in which the main teeth 32 and the holding teeth 48 are engaged with the lead screw 13a by the force of the helical torsion spring 60. FIGS. 5A, 5B, and 5C are sectional views of the plane when various types of impacts are applied to the lead spring 13a relative to the main teeth 32 and the opposite teeth 45.

FIG. 5A illustrates that the second-unit moving frame 2 receives an impact having an impact value A in the optical axis direction. At this time, the main teeth 32 and the holding teeth 48 are engaged with the threads of the lead screw 13a, and the rack 17 does not shift in the axial direction of the lead screw 13a.

FIG. 5B illustrates that the second-unit moving frame 2 receives an impact having an impact value B in the optical axis direction, and the main teeth 32 float over the threads of the lead screw 13a. The impact value B is larger than the impact value A (A<B). At this time, the sub-rack 40 forced by the compression spring 50 approaches to the thread of the lead spring 13a. The distance d between the main tooth and the opposite tooth 45 is set smaller than a height D of the thread of the lead screw 13a. The main rack 30 and the sub-rack 40 are forced by the compression spring 50 and the distance d is maintained. Therefore, both the main teeth 32 and the opposite teeth 45 are engaged with the threads of the lead screw 13a, and the rack 17 does not shift in the axial direction of the lead screw 13a of the rack 17. The holding teeth 48 are engaged with the threads of the lead screw 13a by the force of the helical torsion spring 60.

FIGS. 4B and 5C illustrate that an impact value C is applied to the second-unit moving frame 2 in the optical axis direction. The impact value C is larger than the impact value B (B<C). Due to the reaction from the thread of the lead screw 13a, a force is applied to the main tooth 32 and the opposite tooth in a direction separating them from each other. When this force surpasses the force of the compression spring 50, the main rack 30 and the sub-rack 40 open. As a result, the distance between the main tooth 32 and the opposite tooth 45 increases and becomes d' where a relationship of d<Dd' is established. Therefore, the tooth jump is allowed in which the rack teeth jump over the threads of the lead screw 13a in the axial direction. This configuration prevents a large shearing stress from being applied to the tips of the main teeth 32 and the opposite teeth 45 and the rack teeth and lead screw from being chipped or from getting damaged. The chip or damage would make unstable the subsequent product action and cause poor operations. This embodiment can arbitrarily set the impact value C with which the rack 17 starts opening, by adjusting the force of the compression spring 50.

As described above, the rack 17 according to this embodiment has the following characteristics.

Initially, in the normal state, the main teeth 32 and the holding teeth 48 hold and are engaged with the lead screw 13a. Since the main teeth 32 and the holding teeth 48 hold and are engaged with the lead screw 13a, the force of the helical torsion spring 60 can be made smaller relative to a rack in which only the main teeth 32 are engaged with the lead screw. Since the frictional force between the rack and the lead screw becomes smaller, the rotational load of the zoom motor 13 is restrained, the motor is power-saved and/or the motor and the lens barrel can be made smaller.

Next, the stoppers 34 and 44a restrict the distance between the opposite tooth 45 and the lead screw 13a so that the opposite teeth 45 are separated from the lead screw 13a in the normal state and the distance d between the main tooth 32 and the opposite tooth 45 becomes smaller than the outer diameter D of the lead screw 13a on the plane illustrated in FIGS. 5A-5C. Thereby, the opposite teeth 45 do not contact the lead screw 13a in the normal state, but contact the lead screw 13a and prevent the tooth jumps of the rack when an impact is applied which would otherwise cause the tooth jumps of the main teeth 32 and the holding teeth 48. The engagement units 31 and 44 are configured movable relative to each other so that at least one of the main teeth 32 and the holding teeth 48 are separated from the lead screw 13a against the force applied by the helical coil spring 60. Without the opposite teeth 45, the force applied by the helical coil spring 60 would have to be stronger so as to prevent the tooth jump. Then, the frictional force between the rack and the lead screw would increase, the motor rotational load would augment, and the motor power saving would be lost or the motor and finally the lens barrel would become larger. This embodiment solves these problems by the above configuration.

The compression spring 50 applies a force between the engagement units 31 and 44 which is stronger than the force applied by the helical torsion spring 60. Thereby, the opposite teeth 45 can surely contact the lead screw 13a when the impact has a value equal to or larger than the impact value B and smaller than the impact value C, preventing the tooth jump.

The engagement units 31 and 44 are configured movable relative to each other so that at least one of the main teeth 32 and the opposite teeth 45 are separated from the lead screw 13a against the force applied by the compression spring 50. If the opposite teeth 45 are not movable, a large shearing force is applied to the tips of the rack teeth on very strong impact, and the rack teeth would get chipped and poor operations are likely to occur. Accordingly, this embodiment solves these problems by allowing at least one of the main teeth 32 and the opposite teeth 45 to separate from the lead screw 13a when the very strong impact equal to or larger than the impact value C is applied.

The main teeth 32, the opposite teeth 45, and the holding teeth 48 may be orthogonal to the axis of the lead screw 13a, or may have a lead angle relative to the axis of the lead screw 13a. Since the opposite teeth 45 and the holding teeth 48 may be located on the opposite side of the main teeth 32, the main rack may include the main teeth and the holding teeth and the sub-rack may include opposite teeth or separate members each having a corresponding one of the main teeth 32, the holding teeth 48, and the opposite teeth 45.

As described above, the rack of this embodiment is applicable to a rack for the fourth-unit moving frame 4. While the optical apparatus having the rack 17 of this embodiment may be the image-pickup apparatus, such as a lens integrated type digital still camera, the present invention is applicable to the lens unit that can be detachably mounted onto the image-pickup apparatus.

The present invention is applicable to a variety of industrial products using the rack and the lead screw.

The present invention can provide a compact rack and an optical apparatus using the same, which can prevent a thread jump against a predetermined impact.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-070862, filed Mar. 29, 2013, which is hereby incorporated by reference herein in its entirety.

What is claimed is:

1. A rack attached to a movable member and configured to transmit a driving force of a driver to the movable member, the rack comprising:
   a first member having a first tooth engaged with a lead screw rotated by the driver;
   a second member having a second tooth arranged opposite to the first tooth with respect to the lead screw and engaged with the lead screw;
   a third member having a third tooth arranged opposite to the first tooth with respect to the lead screw and engageable with the lead screw;
   a first forcing unit configured to apply a force between the first member and the second member so that the first tooth and the second tooth approach to each other;
   a second forcing unit configured to apply a force between the first member and the third member so that the first tooth and the third tooth approach to each other; and a limiter configured to limit a distance between the third tooth and the lead screw so that the third tooth is separated from the lead screw when the first tooth and the second tooth are engaged with the lead screw by the force applied by the first forcing unit and a distance between the first tooth and the third tooth is smaller than an outer diameter of the lead screw on a plane that passes the center axis of the lead screw and a contact position between the first tooth and the lead screw.

2. The rack according to claim 1, wherein the second forcing unit applies the force between the first member and the third member which is stronger than the force applied between the first member and the second member by the first forcing unit.

3. The rack according to claim 1, wherein the first member and the third member are configured movable relative to each other so that at least one of the first tooth and the third tooth is separated from the lead screw against the force applied by the second forcing unit.

4. The rack according to claim 1, wherein the first forcing unit is a helical torsion spring.

5. The rack according to claim 1, wherein the second forcing unit is a compression spring.

6. The rack according to claim 1, further comprising a main rack that includes the first member and a shaft that serves as a rotating axis around which the rack rotates relative to the movable member; and a body having a shaft hole part into which the shaft of the main rack is inserted, wherein the second member and the third member are connected to the body.

7. The rack according to claim 6, wherein the body has a step configured to house part of the second forcing unit.

8. An optical apparatus comprising a rack attached to a movable member and configured to transmit a driving force of a driver to the movable member, wherein the rack includes:

a first member having a first tooth engaged with a lead screw rotated by the driver;

a second member having a second tooth arranged opposite to the first tooth with respect to the lead screw and engaged with the lead screw;

a third member having a third tooth arranged opposite to the first tooth with respect to the lead screw and engageable with the lead screw;

a first forcing unit configured to apply a force between the first member and the second member so that the first tooth and the second tooth approach to each other;

a second forcing unit configured to apply a force between the first member and the third member so that the first tooth and the third tooth approach to each other; and a limiter configured to limit a distance between the third tooth and the lead screw so that the third tooth is separated from the lead screw when the first tooth and the second tooth are engaged with the lead screw by the force applied by the first forcing unit and a distance between the first tooth and the third tooth is smaller than an outer diameter of the lead screw on a plane that passes the center axis of the lead screw and a contact position between the first tooth and the lead screw.

9. The optical apparatus according to claim 8, wherein the optical apparatus is an image-pickup apparatus.

10. The optical apparatus according to claim 8, wherein the optical apparatus is a lens unit attached to and detached from an image-pickup apparatus.

* * * * *